Jan. 27, 1970 P. J. VAN HEERDEN 3,492,652

OPTICAL ASSOCIATIVE MEMORY SYSTEM

Filed Dec. 30, 1966 5 Sheets-Sheet 1

INVENTOR
PIETER J. Van HEERDEN

BY

BROWN & MIKULKA
AND ROBERT F. O'CONNELL
ATTORNEYS

*INVENTOR*
PIETER J. Van HEERDEN
*BY*
BROWN & MIKULKA
AND ROBERT F. O'CONNELL
*ATTORNEYS*

INVENTOR
PIETER J. Van HEERDEN
BY
BROWN & MIKULKA
AND ROBERT F. O'CONNELL
ATTORNEYS

INVENTOR
PIETER J. Van HEERDEN
BY
BROWN & MIKULKA
AND ROBERT F. O'CONNELL
ATTORNEYS

OPTICAL ASSOCIATIVE MEMORY SYSTEM

Filed Dec. 30, 1966

5 Sheets-Sheet 5

INVENTOR
PIETER J. Van HEERDEN
BY
BROWN & MIKULKA
AND ROBERT F. O'CONNELL
ATTORNEYS

United States Patent Office 3,492,652
Patented Jan. 27, 1970

3,492,652
OPTICAL ASSOCIATIVE MEMORY SYSTEM
Pieter J. van Heerden, Concord, Mass., assignor to Polaroid Corporation, Cambridge, Mass., a corporation of Delaware
Filed Dec. 30, 1966, Ser. No. 606,267
Int. Cl. G11b *13/04*
U.S. Cl. 340—172.5 33 Claims

ABSTRACT OF THE DISCLOSURE

An optical associative memory utilizing an interference pattern set up by two coherent light beams wherein information stored by the interference pattern can be retrieved by presenting only a small fragment of the original stored information.

This inventional relates generally to optical information storage and retrieval systems and more particularly to a system for recognizing and retrieving information previously stored in a memory system when such information, or a small part thereof, is later presented for recognition in a form which may be different from its form when stored and for rapidly and sequentially storing successive amounts of information within such system.

My previously filed, copending U.S. patent application, Ser. No. 288,013, filed June 14, 1963, now U.S. Patent No. 3,296,594, describes a novel associative memory system which utilizes a storage member comprising a crystal of a semitransparent material, for example, an alkali halide crystal such as potassium bromide. A pair of monochromatic, coherent light beams, such as those derived from a single laser source, are utilized to store information which is contained in an information-containing image, such as contained on a photographic transparency, for example, placed in the path of one of the light beams. Such information may be in the form of a suitable "input-output" or "situation-instruction" pair, as appropriately described in such application.

As further described therein, in order to retrieve from the storage member the desired output or "instruction" information corresponding to a particular input or "situation" information, a representation of such input information (in the form of an image on a photographic transparency, for example) is illuminated by the first of the two coherent light beams and causes an image, which appears to come from the source of the second of said light beams, to appear at a point on an appropriate first image plane at which the second beam was focused during storage of the same input information. Such image has been referred to in my above-mentioned application as a "ghost" image. The storage medium is then also illuminated by the second beam and causes another image, which for purposes of distinguishing it from such ghost image will be referred to herein as a "real" image, of the apparent source of said second beam also to appear at such first image plane. A controlled deflection device deflects the second beam so as to cause such real image of its apparent source at such first image plane to move into coincidence with such ghost image. When coincidence occurs, an image of the stored "instruction" information is caused to appear at an appropriate second image plane where it may be read out by conventional means, such as a television camera tube.

The information retrieval system described in such application includes suitable amplifier and decision circuits as described therein for comparing the positions of the two images generated at the first image plane and for producing an operating signal to be applied in one embodiment to a suitable servo positioning mechanism for deflecting the second beam in such a way as to bring the real image of its apparent source into coincidence with the ghost image.

In such a system, the controlled deflecting means may comprise either a mirror driven by a suitable servo system for controlling the angular position of the mirror or it may utilize a pair of cathode ray tubes having eidophor, or scotophor, screens, or the like, together with conventional circuitry for controlling the electron guns of the two cathode ray tubes causing them to write optical gratings on the faces thereof, the period of such gratings being variable so as to control the direction and magnitude of deflection of the second beam through such tubes.

The invention described herein is an optical associative memory system which provides considerably improved performance over that provided by the system described in my previous application, especially in its ability to retrieve information previously stored therein. More particularly, the ability to retrieve information concerning previously stored objects is improved in situations wherein only a portion, which may, in some cases, represent a very small fragment, of the original stored information is presented to the system during the retrieval operation. Further, such system provides improved performance in situations wherein the optical conditions under which such objects were originally presented for recognition to the system, either alone or in combination with other objects, differ from the optical conditions under which such objects were originally presented for storage. Although not limited thereto, my invention as described herein is particularly useful, for example, in such circumstances where the image of such object, or a portion thereof, as presented for recognition differs in its size, shape or position from the image of such object, or such portion thereof, as presented when such object was originally stored. For example, during retrieval the object may be viewed from a different angular perspective than it was during storage and, consequently, the position of the image of such object at the object plane may differ from its position during storage. As further examples, the dimensions of such image may be altered either linearly (e.g., the image of the object as presented may be larger or smaller than it was when stored) or non-linearly (e.g., the shape, or configuration, of the image of the overall object or one or more portions thereof may be distorted from that which such image or such portion had when originally stored). To correct for such differences in optical viewing conditions, the system of this invention provides an improved method for storing information therein together with appropriate means for causing the image of the object as presented for recognition during retrieval to be changed appropriately in one or more of its size, shape or position characteristics so that it more closely resembles the image of the object as originally presented during storage.

In a preferred embodiment of the invention, three coherent light beams are directed at a storage member comprising a first substantially planar storage element and a second three-dimensional storage element located adjacent thereto and are caused to intersect at such storage member, thereby to provide unique interference patterns at said planar element and at said three-dimensional element to produce appropriate changes, such as by bleaching, in the characteristics thereof in order to store the information desired. Such beams may all be derived in a particular embodiment from a single source wherein a first beam from said source is modulated by an information-containing image to be stored located at an appropriate object plane in the path of such beam. A second beam from said source is focused at a specified point at a reference plane, which plane in a preferred embodiment coincides with the object plane at which said information-containing image is located. The focusing of such second beam produces a first apparent reference light source at a specified and preselected fixed location at said reference plane. A third beam from said source, having a lesser intensity than that of the second beam, is also focused at the reference plane (which plane, as above, preferably coincides with the object plane) and produces a second apparent light source at a specified and preselected location at said reference plane, which location can be controllably varied so as to be different for each of a plurality of separate information-containing images which are to be stored. Such first and second apparent light sources produce a pair of reference beams hereinafter referred to as a fixed reference beam and a variable reference beam, respectively. Such beams, together with the modulated first beam are thence directed toward the storage member where they intersect to form the appropriate interference storage patterns discussed above.

In retrieving information from such storage member, illumination of such medium by the first beam, suitably modulated by an image at the object plane of the object or a portion thereof to be recognized, produces ghost images of the apparent sources of both the fixed reference beam and the variable reference beam at an image plane located on the opposite side of said storage member. For proper recognition, the image produced at the object plane during retrieval must occupy substantially the same position as the image produced at the object plane during the storage operation. If such image is displaced from its original position at the object plane, the ghost images discussed above will similarly be displaced from their correct positions at the image plane and recognition will not occur until they are properly oriented. It should be noted that in the preferred embodiment discussed here a planar storage element is used in combination with a three-dimensional storage element in order to assure that proper orientation is achieved. The characteristics of a three-dimensional element are such that, if such element is used alone, ghost images can only be produced when the position of the image at the object plane O during retrieval exactly matches the position of the corresponding image at object plane O during storage. That is, if a mismatch occurs, no ghost images will be produced at all. On the other hand, with a substantially planar storage element a mismatch in position merely displaces such ghost images from the positions they would have if no mismatch had occurred. Thus, a planar element is utilized in the system of the invention together with a three-dimensional element so that correct orientation can be achieved.

If such ghost images are so displaced, means are provided for moving the image generated at the object plane during retrieval so that the ghost image of the apparent source of the fixed reference beam is moved to a location at the image plane which corresponds to the same relative location of such apparent source at the object plane during storage. For example, if the apparent source of the fixed reference beam was located at the center of the object plane during storage, its ghost image is correspondingly moved to the center of the image plane during retrieval. If the object to be recognized is being viewed by a television camera tube, for example, the desired orientation can be accomplished by moving such camera via suitable servo mechanism means so as to vary the viewing angle at which the camera views such object. Variation of such viewing angle moves the image of such object as presented at the object plane so that the position of the ghost image at the image plane is also caused to move accordingly. The ghost image of the apparent source of the fixed reference beam, rather than that of the variable reference beam, is selected for control purposes since it has the greater intensity of the two ghost images involved and, thus, means are provided, as discussed below, for selecting the brightest of the ghost images so formed during this phase of the operation.

When the ghost image of the apparent source of the fixed reference beam has been correctly located (which operation also simultaneously moves the less bright ghost image of the apparent source of the variable reference beam to its corresponding correct location), the storage member is then illuminated with light from the apparent source of the variable reference beam to produce at the image plane another image of the apparent source of said beam which image, as discussed above, is hereinafter referred to as a real image of said variable reference beam. By suitable means, the real image of the apparent source of the variable reference beam is caused to appear at a position which coincides with the position of the ghost image of the apparent source of such beam. When such coincidence occurs, an image of the originally stored information is automatically generated at the image plane and such information can be appropriately processed for subsequent use.

In order to enhance the capability for performing the above procedure, the ghost images so produced should be as clear and distinct as possible, that is, the light intensities of such images should be maximized. Maximization occurs if the configuration of the image of the object, when presented during retrieval at the object plane, is substantially the same as its configuration when presented originally for storage. Since one important characteristic of such image configuration is its size, the camera which is viewing such object is equipped with a zoom-type lens to change the size of the image of such object to conform to the size of such image when it was originally stored. In addition, other suitably controlled optical distorting means may be used with the camera tube to provide further desired changes of the image of the object at the object plane when presented for recognition in order to maximize the ghost image intensities. The details of such an overall storage and recognition system are described in more detail below.

In the system described above, as well as in the system described in my above-referenced copending application, in order to store a first piece of information it is necessary to insert an information-containing image, in the form of a suitable transparency, for example, into an appropriate object plane positioned in the path of a first beam during the storage operation. In order to store a subsequent piece of information, it is necessary to remove the first transparency and replace it with a second transparency containing an image of such subsequent piece of information. In order to store sequentially a large number of discrete pieces of information, separate transparencies containing such discrete information must be successively inserted therein, either manually or by some suitable mechanical means.

Because of the need for manual, or suitable mechanical, means for removing and substituting different transparencies, the ability of such a system to store separate pieces of information rapidly is severely hampered. To improve such operation, the invention described herein provides a system wherein a plurality of separate information-containing images are rapidly and successively disposed in the path of a first coherent light beam for modulating such beam. Such successive images may be generated in a particular embodiment by sequentially supplying electrical signals representing separate pieces of information to the input of a cathode ray tube of the type having an eidophor screen which is so located that an image of such information, generated on the screen of such tube, is disposed in the path of such beam. As the input information changes, the image representing such information changes accordingly. Since the response of such eidophor tube to such changing information is extremely fast, a rapid means is obtained for forming a plurality of separate, information-containing images for modulating the first beam when such images are placed in the path thereof. The information is then rapidly and sequentially stored in a storage member in a manner similar to that described in my previous application or to that described above. A specific system for providing such operation is described in more detail below.

In general then, the invention can be described more particularly with reference to the accompanying drawings wherein:

FIG. 1 depicts a substantially schematic diagram of a system for storing and retrieving information, which system represents a particular embodiment of the invention;

FIGS. 2A, 2B and 2C each depict a portion of the embodiment of FIG. 1 for showing the paths of each of the coherent light beams utilized in such embodiment;

Figure 1:
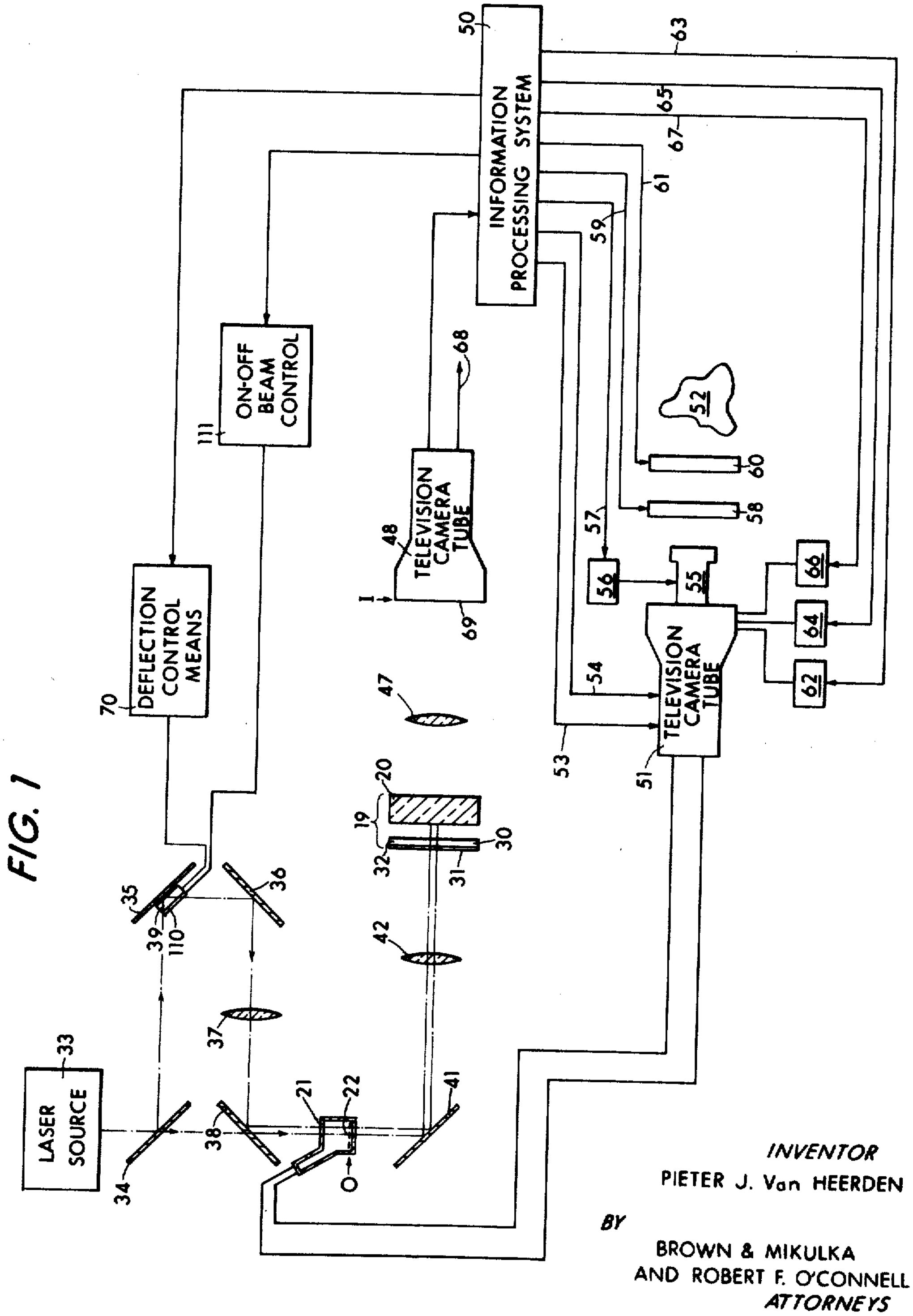

The overall system shown in FIG. 1 is useful in retrieving information previously stored therein and is particularly suited for the recognition of objects, information concerning which has been previously stored in such system, when the system is subsequently presented with a complete, or a partial, image of a representative likeness of such object. Although not limited thereto, one example of the application of such a system may be in a personnel identification system. If information derived originally from a live, a photographic, or other representative, likeness of a person has been stored within the system, the system can retrieve such information (i.e., identify such person) when it is presented at a later time with an image, or at least a portion thereof, of another live representation, or other likeness, of such person.

In the particular embodiment of such an identification, or recognition, system as shown in FIG. 1, for example, the original information is stored in a storage member 19 comprising a substantially planar storage element 30 which may be in the form of a plate comprising a layer 31 of light sensitive material coated on a glass substrate 32, and a three-dimensional storage element 20, such as an alkali halide crystal of the type described in my previously filed application, located adjacent thereto. The material used in element 30 may be in the form of a thin layer, in the order of 10 microns or less, and constitutes a permanent memory system, as does the crystal element 20. As such, the layer can be made of any appropriate material which will retain such information permanently without additional processing, such as the alkali halide crystal material used in element 20, or any other suitable light sensitive material.

The information is originally stored by exposing both light sensitive storage elements 20 and 30 simultaneously to three coherent light beams intersecting at said storage elements to form interference patterns therein, one of said beams having been modulated by an information-containing image disposed in the path thereof. For clarity the optical paths of such beams are not shown in FIG. 1, the storage operation being better explained with the help of the drawings shown in FIGS. 2A, 2B and 2C which depict the paths of each of said beams separately. Such beams are shown in this embodiment as being derived from a single laser source 33 (alternatively, separate sources may be used so long as such sources are monochromatic and at all times maintain frequency and phase coherency). In FIG. 1 the single source system utilizes a laser source 33, a beam splitter 34, a first deflection mirror 35, a second deflection mirror 36, a lens 37 and a third deflection mirror 38. A suitable deflection system such as a prism system 39, the structure and function of which is described in more detail below with reference to FIG. 3, is positioned in front of fixed deflection mirror 35.

Figures 2A, 2B, 2C, 3:
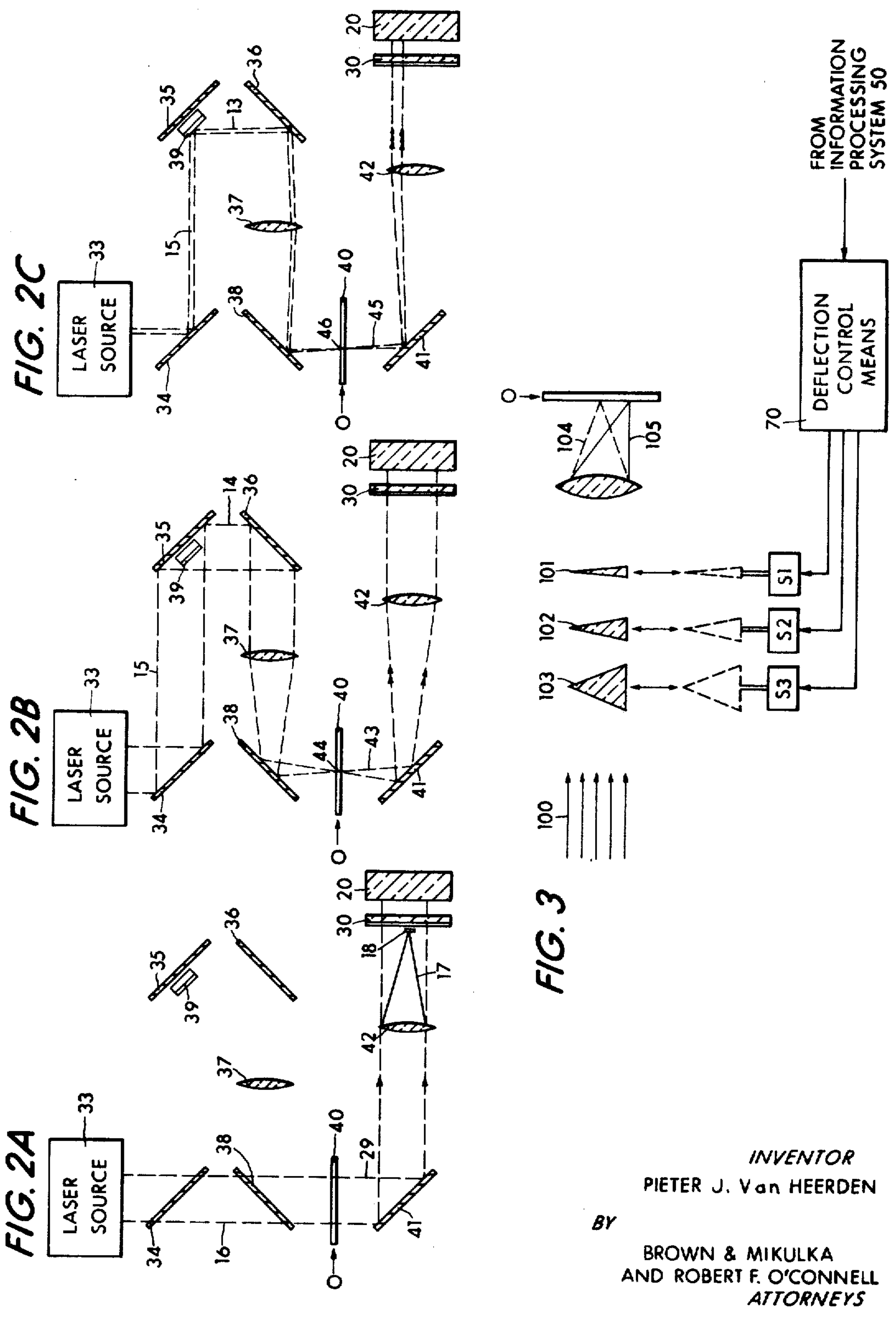
FIG. 3 depicts a schematic diagram of a portion of the system in FIG. 1.

With reference to FIGS. 2A, 2B and 2C, the paths of each of the three intersecting beams required in the storage process are shown separately and the information-containing image, which as discussed more completely below may be displayed on the screen 22 of an eidophor tube 21 as shown in FIG. 1, is shown diagrammatically, for the sake of illustration only, as a planar image 40 formed at an object plane O. A first beam 16 in FIG. 2A represents a portion of the light from a light source, such as laser source 33, which is directed toward information-containing image 40 through beam splitter 34 and semi-transparent mirror 38, the latter being of the type which transmits light in one direction but does not transmit light in the opposite direction. Beam splitter 34 separates the light beam from laser source 33 into two beams directed along divergent paths, the first beam 16 being directed through beam splitter 34 toward mirror 38 as shown in FIG. 2A and the second beam 15 being directed toward mirror 35 as shown and discussed below with reference to FIGS. 2B and 2C. Beam 16 which is directed through semitransparent mirror 38 is modulated (in this case by diffraction) by information-containing image 40 and such modulated beam 29 (shown as a single-arrowed beam for identification purposes) is then directed by reflection from mirror 41 toward storage elements 20 and 30 through a lens 42. The non-diffracted direct rays 17 of beam 16 (i.e., the unmodulated portion thereof) are focused at a single point just short of the storage plane of storage element 30 where a member 18 is provided for blocking such rays, as described in my previously filed application, while the modulated portion thereof impinges upon storage elements 20 and 30 as shown.

In FIG. 2B beam splitter 34 splits off a portion of the the beam from source 33 to form another beam 15 which is directed toward fixed deflection mirror 35 as shown. A portion 14 of such beam is deflected by mirror 35 and is then further deflected by fixed deflection mirror 36 through lens 37 to deflection mirror 38, which causes such portion of the beam to become focused at a point 44 at the object plane O at information-containing image 40. Since mirrors 35, 36, and 38 are all fixed in position, such beam is always focused at the same point at object plane O which in the embodiment shown is arbitrarily selected to occur at the center of information-containing image 40. Point 44 thence represents the location of an apparent light source which produces a fixed reference beam 43 (shown for identification purposes by a double-arrowed beam) which is directed by reflection from mirror 41 toward storage elements 20 and 30 where it intersects with modulated beam 29.

In FIG. 2C a prism deflection system 39 deflects another portion 13 of beam 15 which has been split off from laser source 33 by beam splitter 34, which portion is directed toward deflection mirror 36 as shown. Because beam portion 13 is a relatively smaller portion of beam 15 than is beam portion 14, it has a light intensity which is considerably less than that of beam portion 14, being in the order of 10% to 20% of such latter beam portion. Beam portion 13 as reflected from deflection mirror 36 is brought to a focus at a second point 46 at information-containing image 40 at object plane O via deflection mirror 38 and lens 37, generally in the same manner as discussed above with reference to beam portion 14 shown in FIG. 2B. The location of point 46 in general differs from the location of point 44 and such location can be varied by controlling the operation of prism deflection system 39 as described below. Point 46, thus, represents the location of an apparent light source which produces a variable reference beam 45 (shown for identification purposes by a triple-arrowed beam) which is directed by reflection from mirror 41 toward storage elements 20 and 30 where it intersects with modulated beam 29 and fixed reference second beam 43. The intersection of the three beams thereby forms unique interference patterns at storage elements 20 and 30 as required. Point 46 is selected to be positioned at a different preselected location for each different information-containing image which is placed at the object plane O during the storage operation.

With reference to FIG. 1, therefore, if the three beams (i.e., modulating beam 29, fixed reference beam 43 and variable reference beam 45) are formed as shown in FIGS. 2A, 2B and 2C, the resulting interference patterns at storage elements 20 and 30 store the unique information contained in image 40, which information is then available for retrieval at a later time. The storage capacity of three-dimensional element 20 is considerably greater than that of planar element 30, although sufficient information can be stored in the latter to perform its appropriate function during the retrieval operation as discussed more fully below. As further discussed below, information from a plurality of images placed at object plane O can be stored separately and successively in a rapid fashion if such images are sequentially formed on the screen 22 of an eidophor tube 21.

In the embodiment of FIG. 1 deflection of beam portion 13 is provided by a prism system 39, the operation of which can be most clearly described with reference to FIG. 3. A portion of a typical prism system shown therein comprises, for example, a plurality of prisms, each of which is capable of being moved into a position in the path of beam portion 13. For convenience in describing its operation, such prism system is shown in FIG. 3 as providing essentially a direct, or "in-line," path for such beam portion from its source to the object plane O, although the beam may be directed in any desired path by an appropriate deflection system such as is set forth in FIG. 1. In FIG. 1 prism system 39 is located substantially adjacent the center of mirror 35 and, as discussed above, intercepts only a relatively small portion 13 of the split-off beam 15 which is directed thereto.

Such beam portion 13 (designated for illustrative purposes in FIG. 3 as beam 100) is directed toward a part of prism system 39, which part comprises three prisms 101, 102, and 103 which can be used in a variety of combinations, as discussed below, to deflect beam 100 through a plurality of discrete angles. Although only three prisms are shown for simplicity in explanation, it is clear that more prisms may be used to provide a more elaborate deflection system. In the system shown, prism 101 may cause a beam deflection through an angle $\alpha$, prism 102, a beam deflection through an angle $2\alpha$, and prism 103, a beam deflection through an angle $4\alpha$. Thus, if none of the three prisms is disposed in the path of incoming beam 100, such beam is not deflected at all (shown by dash lines 104). If all three prisms are disposed in the path of beam 100, such beam is deflected through a total angle of $7\alpha$ (shown by solid lines 105). Various combinations of such prisms will produce eight different discrete angular deflections (differing by $\alpha$ or a multiple thereof) from 0 to $7\alpha$. As a further illustration, if only prisms 101 and 103 are disposed in the path of beam 100, such beam is deflected through an angle of $5\alpha$.

A convenient system for providing a preselected discrete angular deflection of beam 100 can be achieved by setting up a suitable control system for inserting a combination of one or more of such prisms into the path of beam 100 in accordance with appropriate digital input encoding signals. For this purpose, prisms 101, 102 and 103 may be connected to the movable arms of suitable solenoids $S_1$, $S_2$ and $S_3$, respectively, and are capable of moving between a first non-actuated position (shown by the dashed lines) to a second actuated position (shown by the solid lines). Such solenoids may be actuated in any suitably known manner as, for example, in response to a digitally coded input signal from a deflection control means 70 which signal may be in the form of a binary coded signal. For example, if it is desired to deflect beam 100 through an angle $\alpha$, a digital signal in the form of three binary digits 0–0–1 can be used to control the solenoid system so that only solenoid $S_1$ is actuated, thereby causing only prism 101 to be inserted into the path of the beam, while $S_2$ and $S_3$ remain unactuated. If a digital input signal in the form of the three binary digits 1–0–1 is used as the input to the prism system, solenoids $S_1$ and $S_3$ are actuated ($S_2$ remains unactuated) and prisms 101 and 103 are inserted into the path of beam 100 to provide an angular deflection of $5\alpha$. Other input binary digit signal combinations will produce various combinations of actuated solenoids in response thereto.

Thus, for the particular three-prism system shown in FIG. 3, eight separate, discrete deflection angles can be provided for beam 100. A similar group of three prisms (not shown) can be used to form another part of the overall prism system 39 and may be set up in an orthogonal position relative to those shown in FIG. 3 to deflect beam 100 through eight discrete angles in a perpendicular direction.

Thus, by the use of a combination of two such orthogonally located groups of three prisms, beam 100 can be brought to a focus at object plane O so that point 46, as shown in FIG. 2C, is caused to occupy any one of 64 preselected positions at such plane. If a greater number of preselected positions for point 46 is desired, the prism system 39 may be made more elaborate by using additional prisms. For example, the use of orthogonal groups of five prisms each provides over a thousand separate positions for point 46. Any suitable control system known to those in the art, as represented by deflection control means 70, can be used to provide binary coded input signals to actuate an appropriate combination of solenoids in response thereto.

Thus, a system such as described with reference to FIG. 3, or a variation thereof, can be used to produce a specified location for point 46, in accordance with a preselected code, for each information-containing image which is stored in the overall storage system of FIG. 1. For each such location of point 46 representing the location of the apparent source of variable reference beam 45 during storage, a corresponding location of the ghost image of the apparent source of variable reference beam 45 is provided at image plane I during retrieval.

The system of FIG. 1, thus, is readily adaptable for retrieving or recognizing information which has previously been stored therein. For example, in an object identification system let us suppose that information concerning a particular object has been stored previously in the system of FIG. 1 by presenting, during storage, an image of such object at object plane O in the manner described above with reference to FIGS. 2A, 2B, and 2C. Let us then suppose that the same object, or a portion thereof, represented as object 52 in FIG. 1, is later presented for viewing by the system and it is desired that the system recognize (i.e., identify) object 52 as being the same, or a part of the same, object as that originally stored in the system. The object may be viewed, for example, by a television camera tube 51 which provides a video output signal applied to eidophor tube 21 for presenting an image thereof at screen 22 of said eidophor tube at object plane O. For the particular case where such image, or portion thereof, has substantially the same configuration (i.e., the same size, shape and position) as the image, or portion thereof, of such object when originally presented to the system during storage, information concerning such object can be retrieved in the following manner.

If the modulated beam from laser source 33 is used to illuminate storage elements 20 and 30 (i.e., such beam is directed through beam splitter 34 and mirror 38 to the image as presented at object plane O and is thence directed toward the storage elements 20 and 30), a first ghost image, which appears to be coming from the apparent source at point 44 of fixed reference beam 43, will appear at an image plane I essentially at the center of such image plane, if point 44 was at the center of object plane O during storage. In addition, a second ghost image, which appears to be coming from the apparent source of variable reference beam 45 at point 46, will also appear at a corresponding position at image plane I, that is, its relative position with reference to the first ghost image is the same as the relative position of point 46 with reference to point 44 at object plane O during storage. If the storage elements are then eluminated with light from the apparent source of variable reference beam 45, a real image of the apparent source of variable reference beam 45 is produced at image plane I. If the position of such real image, as focused at image plane I, coincides with the position of the ghost image of variable reference beam 45, an image of the information concerning such object as originally stored is then automatically produced at image plane I where it, or any portion of it, can be picked up by the screen 69 of a television camera tube 48 located at such plane, from whence it can be read out and transformed into an appropriate information output signal 68 as required.

The above described operation depicts the process for retrieving or recognizing information previously stored when the previously stored object, or a portion thereof, is later presented for view to the system and produces an image at object plane O which has substantially the same size, shape and position as it had during the storage process. However, in practical operation such image may not generally have the same configuration since the object will not always be viewed in the same manner as it was when originally stored. For example, television camera tube 51 may view object 52 from a different viewing angle and the position of its image at object plane O, thus, will be changed accordingly. In addition, object 52 may present an image at object plane O which has a different size from such image as presented during storage. If such conditions exist, the system will not be able to correctly identify such object since the appropriate ghost images discussed above will not be clearly produced at image plane I. In order to provide accurate recognition of object 52, a plurality of control circuits, such as those shown, for example, in FIGS. 5, 6 and 7, must be utilized to present an image at object plane O during retrieval which has substantially the same position in such object plane and which has substantially the same configuration as the image presented at the object plane during the storage operation.

As discussed above, if a three-dimensional memory crystal were used alone in the system shown in FIG. 1 in an effort to provide a large storage capacity, the information stored therein cannot be easily retrieved if the image at object plane O during retrieval is not correctly positioned at such plane because under such conditions it is substantially impossible to generate ghost images of the fixed and variable reference beams at image plane I. On the other hand, if a planar storage element is used, a displacement of the image at object plane O merely causes a corresponding displacement of such ghost images at image plane I. However, if a planar element is used alone, not only would its storage capacity be less than that of a three-dimensional storage element but also multiple and superimposed images of each of the different information-containing images stored therein may be produced at the image plane during the retrieval operation and a clear recognition of the correct information concerning one particular image may not be possible. The generation of such multiple images will not occur if a three-dimensional element is used.

Hence, it is preferable to use a combination of planar storage element 30 together with three-dimensional storage element 20 and, thus, obtain the advantages of both. Although the storage capacity of planar storage element 30 may not be great enough to store complete information concerning each of such information-containing images, a sufficient portion of the information from each of such information-containing images can be stored therein to produce an appropriately intense ghost image at image plane I of the apparent source of fixed reference beam 43 to allow the image at object plane O to be correctly oriented during the retrieval operation. Thus, in the system of FIG. 1 the function of planar element 30 primarily is to store sufficient information to provide for the correct positioning of the image at object plane O during retrieval.

Since the storage capacity of three-dimensional storage element 20 is so much greater than that of a planar storage element 30, once the image is properly oriented, the three-dimensional storage element, which contains more complete information with reference to each of the stored images, is used as the primary storage source so that its more complete stored information can be reproduced at the image plane I.

Because the ghost images of the fixed and variable reference beams involved cannot be correctly oriented unless they are first clearly reproduced at image plane I, television camera tube 51, in the first instance, is equipped with a zoom-type lens 55 which is capable of being moved in and out over a relatively wide range to change the size of the image of the viewed object presented at the object plane O continuously over a corresponding range. For this purpose, information processing system 50 includes a control circuit, discussed in more detail below with reference to FIG. 5, which provides an output signal 57 for actuating a drive motor 56 for the zoom-type lens to move the latter into a position, and also to maintain it as such position, at which the ghost images produced at image plane I have their maximum clarity (i.e., their maximum intensity). Because of the relatively greater intensity of the ghost image of the apparent source of fixed reference beam 43 (i.e., it will be the brightest ghost image produced at image plane I), zoom-type lens 55 is controllably moved until the ghost image of the apparent source of that beam appears and achieves its maximum intensity, at which time the ghost image of the apparent source of variable reference beam 45 will also achieve a correspondingly strong intensity which, of course, is less than that of beam 43.

If, at the same time, television camera tube 51 is not viewing object 52 at substantially the same viewing angle as it did when the storage operation occurred, the position of the image of such object at object plane O will be shifted accordingly. Correspondingly, the position of the ghost image of the apparent source of fixed reference beam 43 (and also that of variable reference beam 45) at image plane I, as derived from the information stored in planar element 30, will be displaced from the center of image plane I by the same amount. Hence, once the intensity of such ghost image is maximized, provision is made to move such displaced ghost image to the center of image plane I by moving television camera tube 51 angularly about its vertical and horizontal axes to cause it to be directed at object 52 from the same angle of view which it had during storage. Such operation is achieved by providing a pair of control signals 63 and 65 from an information processing system 50 to actuate motors 62 and 64, respectively, as discussed with reference to FIG. 6. As television camera tube 51 moves angularly about its vertical and horizontal axes, the image of object 52 at object plane O and the ghost image of the apparent source of fixed reference beam 43 (as well as that of variable reference beam 45) at image plane I move correspondingly. Movement of television camera tube 51 is controlled so that the appropriately selected ghost image of the apparent source of beam 43 is brought to the center of image plane I. Once the image size has been appropriately corrected by use of the zoom-type lens system, the ghost image becomes sufficiently identifiable for the above position correction system to be actuated so that the image at object plane O is correctly oriented during the information retrieval operation. Once correct orientation is achieved the intensities of the ghost images formed at image plane I, as derived from the information stored in planar element 30, are substantially reinforced by the more complete information stored in three-dimensional element 20. In fact, it can be said that once correct orientation occurs the ghost images so generated (and ultimately the desired image of the stored information) is primarily derived from the information stored in three-dimensional element 20.

In addition to the use of zoom-type lens 55 for size correction, further refinements for maximizing the intensity of the ghost image of the apparent source of variable reference beam 45 are provided in the form of additional distortion control elements for use in conjunction with television camera tube 51. For example, the image of object 52 at object plane O may be distorted in accordance with one or more of the distortion characteristics depicted in FIGS. 4A, 4B, 4C and 4D, where, for purposes of illustration only, such image is depicted as a square.

In one instance (with reference to FIG. 4A), the image may be rotated through a slight angle in either direction by rotating television camera tube 51 about its longitudinal axis. Such rotation may be achieved by providing a control signal 67 which will actuate a motor 66 to provide the appropriate angular rotation.

Figures 4A, 4B, 4C, 4D:
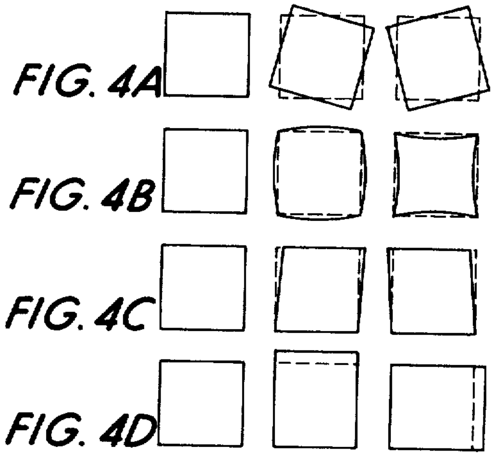
FIGS. 4A through 4D depict various forms of optical distortion capable of being provided in the embodiment of the invention shown in FIG. 1.

With reference to FIG. 4B, the image may be distorted by providing an optical system 58 at camera tube 51 which produces either a "barrel" type or a "pin-cushion" type of distortion, such system being controlled by an appropriate output signal 59 from information processing system 50.

Further, an optical system 60 may also be provided for changing the overall shape of the image in the manner shown in FIG. 4C, which distortion is equivalent to changing the configuration of the square, for example, to a rhomboid shape and shall be referred to here as a rhomboid-type distortion. For this purpose, an appropriate signal 61 is provided to control the operation of optical distortion system 60.

Moreover, by appropriately changing the scanning characteristics of television camera tube 51, as by changing the amplitude, in either the X or Y direction, of the scan signals in such camera tube, the image of the object may be changed as shown in FIG. 4D, which distortion is equivalent to changing the linear dimensions of the image in either orthogonal direction (e.g., changing the square either to a horizontal or to a vertical rectangle). Appropriate signals 53 and 54 derived from information processing system 50 may be utilized to control such scan variations.

An example of an appropriate type of control circuit for providing suitable control signals for actuating any of the above various distortion devices is discussed in more detail with reference to FIG. 7.

Figure 5:
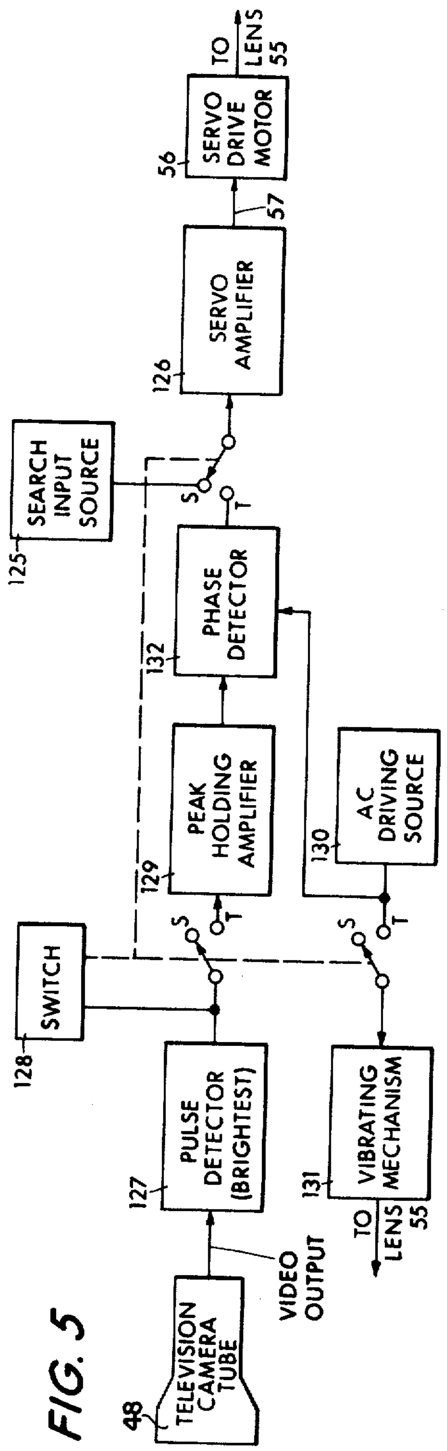
FIG. 5 depicts a block diagram representing a particular embodiment of a portion of the information processing system shown in FIG. 1.
Figure 6:
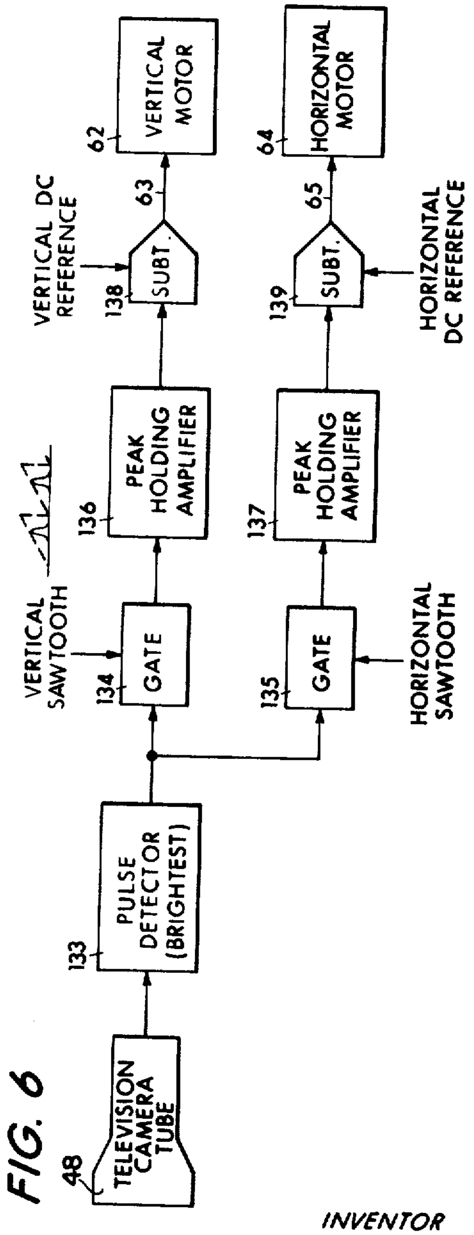
FIG. 6 depicts a block diagram representing a particular embodiment of another portion of the information processing system shown in FIG. 1.
Figure 7:
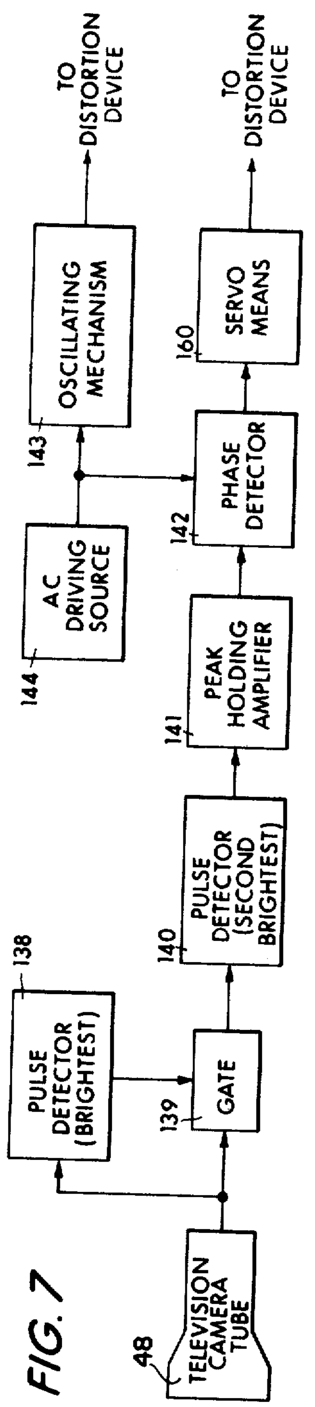
FIG. 7 depicts a block diagram representing a particular embodiment of still another portion of the information processing system shown in FIG. 1.

Reference can now be made to FIGS. 5, 6, and 7 to discuss in more detail typical control circuits for providing the operations described above. Such control circuits are types well-known to those in the art and are exemplary only since others will occur to those in the art for providing similar operations.

FIG. 5, for example, shows a block diagram of one such typical control circuit for providing an appropriate output signal 57 for servo drive motor 56 which moves zoom-type lens 55 through its complete range of positions so that the size of the image produced at object plane O can be controllably changed until the ghost image of fixed reference beam 43 at image plane I achieves a maximum intensity. As can be seen in FIG. 5, the control circuit operates in two modes, a search mode which moves zoom-type lens 55 through its complete range to an approximately correct location for producing a ghost image of fixed reference beam 43 having substantially its maximum intensity. When the lens is so positioned, the circuit switches to a tracking mode which further optimizes the size of the image at object plane O and maintains it at such size for maximizing such intensity even if the object 52 being viewed by television camera tube 51 subsequently moves with reference to the camera.

In such system a search input signal source 125 provides a suitable input signal to a servo amplifier 126, the output signal 57 of which is used to actuate a servo drive motor 56 to move lens 55 through its complete range of positions. If the size of the image produced at object plane O does not correspond to the size of such image when originally stored, a ghost image of fixed reference beam 43 may not initially appear at all at image plane I. In such case the servo drive motor moves lens 55 until such ghost image does appear. At such point television camera tube 48 picks up such image and the video output signal from camera tube 48 is fed to a pulse detector 127 capable of producing an output pulse when its output is equal to or greater than a present level. When detector 127 detects a pulse which is equal to or greater than such preselected level which is set at a value sufficient to detect the brightest expected image (i.e., the ghost image of fixed reference beam 45), its output signal actuates switch 128 to change the system from its search phase into its tracking phase. Such operation moves contact elements of switch 128 from their search positions (designated by the letter "S") as shown in FIG. 5 to their alternate tracking positions (designated by the letter "T"). At this point the output of pulse detector 127 is connected to a peak holding amplifier 129. At the same time an A-C driving source 130 has its output fed to the input of a vibrating mechanism 131 which causes lens 55 to oscillate at a relatively small amplitude about its position, as determined above in the search phase. The output of peak holding amplifier 129 is a variable amplitude signal which is oscillating in accordance with the changing intensity of the ghost image of fixed reference beam 43, which intensity changes as lens 55 oscillates in response to vibrating mechanism 131. Such signal is then compared in a phase detector 132 with the variable output signal from A-C driving source 130 which phase detector produces an output signal of one polarity when its input signals are in phase, an output signal of the opposite polarity when its input signals are out of phase and a zero output signal when its input signals are of different frequencies.

If lens 55 is at a position where the correct image size at object plane O is achieved for producing the brightest ghost image of fixed reference beam 43, the signal from peak holding amplifier 129 has a frequency which is essentially twice that of the signal from A-C driving source 130 and the output of phase detector 132 is zero. Consequently, servo drive motor 56 causes lens 55 to remain at such position. If the size of the image at object plane O is incorrect (i.e., the average intensity of such ghost image is less than its maximum value), peak holding amplifier 129 produces an oscillating signal of the same frequency as that of A-C driving source 130, such signal being either in phase with the driving source signal or out of phase therewith depending on whether the lens must be moved in one direction or the other in order to reach a maximum average intensity.

Thus, the system of FIG. 5 provides a means for moving lens 55 to produce a ghost image of fixed reference beam 43 having a maximum intensity and for maintaining such ghost image substantially at its maximum value. Such operation is analogous to similar search and tracking operations utilized in radar systems where it is desired to maximize the intensity of an incoming echo signal by appropriately moving the antenna or tracking device.

Once the ghost image of fixed reference beam 43 has achieved its maximum intensity, a control circuit as shown in the block diagram of FIG. 6 can be utilized to move such ghost image to an appropriate preselected position at image plane I, such as the center thereof. In such control circuit, the video output of television camera tube 48 is fed to a pulse detector 133 which as above is set to produce an output pulse when it detects the brightest ghost image at image plane I (i.e., the ghost image of fixed reference beam 43). The output pulse from pulse detector 133 is fed to a pair of gates each of which triggers a portion of the vertical and horizontal sawtooth signals, respectively, for feeding to peak holding amplifiers 136 and 137. Such amplifiers produce D-C output signals at the level of the input pulse from gates 134 and 135 which signals are fed into a pair of subtractor circuits 138 and 139 which compare the vertical and horizontal D-C output signals from peak holding amplifiers 136 and 137 with vertical and horizontal D-C reference signals representing the desired preselected center position. The output of subtractor circuits 138 and 139 thereby produces a pair of error signals 63 and 65 for actuating vertical drive motor 62 and horizontal drive motor 64, respectively, to move television camera tube 51 about its vertical and horizontal axes until such error signals are reduced to zero at which point the ghost image of fixed reference beam 43 at image plane I is correctly positioned at the center of image plane I (correspondingly, the ghost image of variable reference beam 45 is also thereby located at its correct relative position).

When such ghost images are correctly located, one or more control circuits, such as shown in the block diagram of FIG. 7, can be used to further maximize the intensity of the ghost image of variable reference beam 45 by controlling the operation of a plurality of known distortion devices in accordance with the distortion characteristics described in FIGS. 4A, 4B, 4C and 4D. The system of FIG. 7 is substantially similar to that of FIG. 5 except that no search phase is required and the ghost image under consideration now represents the second brightest ghost image at image plane I rather than the brightest. For this reason a pulse detector 140, the output of which is connected to peak holding amplifier 141, is used to detect only such second brightest ghost image (i.e., the ghost image of variable reference beam 45). To accomplish such operation the video output of television camera tube 48 is supplied to pulse detector 140 through a gate 139 and is also supplied to a second pulse detector 138 which is set to detect the presence of the brightest ghost image of fixed reference beam 43. Gate 139 closes only when pulse detector 138 produces an output signal, so that detector 140 is supplied with a video output signal from camera tube 48 at all times except when the brightest ghost image is being detected. The level of pulse detector 140 is set to detect the second brightest ghost image and its output is fed to a peak holding amplifier 141 and thence to phase detector 142. In a manner similar to that described with reference to FIG. 5 the output of phase detector 142 is fed to a suitable servo means 160 for driving an appropriately known distortion device for producing whatever type of distortion is required. In a manner also similar to that shown in FIG. 5, the motion of such distortion device has superimposed thereon a relatively small amplitude oscillating motion imparted by a suitable oscillating mechanism 143 driven by an A-C driving source 144. The output of A-C driving source 144 is also fed to phase detector 142 and the control system thereby controls such distortion device in a manner such that maximum intensity of the second brightest ghost image of variable reference beam 45 is always maintained as similarly discussed with reference to FIG. 5. A single control system such as shown in FIG. 7 may be used sequentially to drive each of said distortion devices successively or a plurality of such systems may be utilized to drive such devices simultaneously as desired. If such a plurality of systems is used, the system frequencies should each be different to avoid interactions therebetween.

Thus, the control circuits shown in FIGS. 5, 6 and 7 represent suitable means for providing for the correct size, shape and position of the image at object plane O of the object being viewed by television camera tube 48 during the retrieval operation. Other control circuits may occur to those skilled in the art and, as discussed above, the types shown herein are considered well-known and exemplary only.

Use of all of the various optical distortion and positioning devices discussed above provides ghost images having maximum intensities at image plane I, at which time the appropriately oriented ghost images of the apparent source of fixed reference beam 43 and the apparent source of variable reference beam 45 are readily identifiable. Storage member 19 is thereupon illuminated by variable reference beam 45 to produce a real image of the apparent source of such beam at image plane I. Such illumination may be appropriately controlled by any suitably known "ON-OFF" beam control system 111, shown in FIG. 1, which in its "ON" position opens a shutter (shown schematically as element 110) to allow the beam from prism system 39 to be focused at object plane O to form an apparent source for variable reference beam 45 which is thence directed toward storage elements 20 and 30. During the process of orienting and maximizing the intensities of the above ghost images, shutter 110 may be held in its closed, or "OFF," position.

Means are then provided for assuring that the positions of the appropriate real image and the appropriate ghost image of the apparent source of variable reference beam 45 at image plane I coincide by appropriately controlling the deflection of such beam via prism system 39 in accordance with the operation of such system as described with reference to FIG. 3. When coincidence occurs, an image of the originally stored information, primarily derived as discussed above from the information stored in three-dimensional element 20, is produced at image plane I.

In the system discussed with reference to FIGS. 2B and 2C, although beam portions 13 and 14 are shown as being brought to a focus at object plane O, it is not necessary that points 44 and 46 lie in object plane O. Such beams may be brought to a focus at a different reference plane and thence directed along different paths therefrom toward storage elements 20 and 30, in which case during the retrieval operation the ghost images of the apparent sources of the fixed and variable reference beams will appear at a image reference plane other than image plane I. In order to provide for the correct orientation of such ghost images, a separate camera tube, the screen of which is located at the new image reference plane must be used. Alternatively, camera tube 48 may be set up to be moved to a position where its screen is first located at the new reference image plane during the orientation operation and then later moved to its location at image plane I as shown in FIG. 1 during the remaining steps in the information retrieval operation. Either method increases the complexity of the system shown in FIG. 1. Such complexity can be removed if the reference plane on which points 44 and 46 are focused is made to coincide with object plane O as shown, so that the necessity for using two camera tubes or a cumbersome system for moving camera tube 48 as described above is avoided.

In addition, planar storage element 30, as shown in FIG. 1, is located at the focal plane of lenses 42 and 47. Such location assures that the ghost images of the apparent sources of beams 43 and 45 during the orientation process will be formed and brought to a focus at the image plane I where the image of the information stored in elements 20 and 30 is ultimately formed during retrieval. If storage element 30 is not so located, ghost images of the apparent sources of beams 43 and 45 will not be formed at all if the image at object plane O is displaced.

The system of FIG. 1 is very useful in recognizing or identifying objects or retrieving information concerning objects previously stored even when only a portion of such original object is presented for recognition to the system. By utilizing the system of FIG. 1, appropriate ghost images of the apparent sources of fixed reference beam 43 and variable reference beam 45 can be produced even if only a fragment of the original object is presented for view to the system, so long as the image of such fragment can be appropriately oriented relative to the position of the corresponding fragment of the original image presented at the object plane during storage. Of course a certain minimum amount of information must be presented for view (i.e., the fragment cannot be too small) in order to produce ghost images having sufficient intensities to be useful. However, only a very small percentage of the original information presented for storage need be presented for view during the retrieval operation in order to generate sufficiently intense ghost images to allow appropriate retrieval of the information which has been stored. Moreover, such system, because of this feature, can be used to recognize objects even if portions of such objects have been changed in their appearance to some extent. For example, in a personnel identification system, the face of a person which has previously been stored may be appropriately recognized even if the person when later presented for recognition is wearing different clothes (e.g., a different tie, a hat which was not originally worn during the storage operation, etc.). So long as a sufficient portion of the original information is presented to view for retrieval, appropriate recognition can take place.

Figure 8:
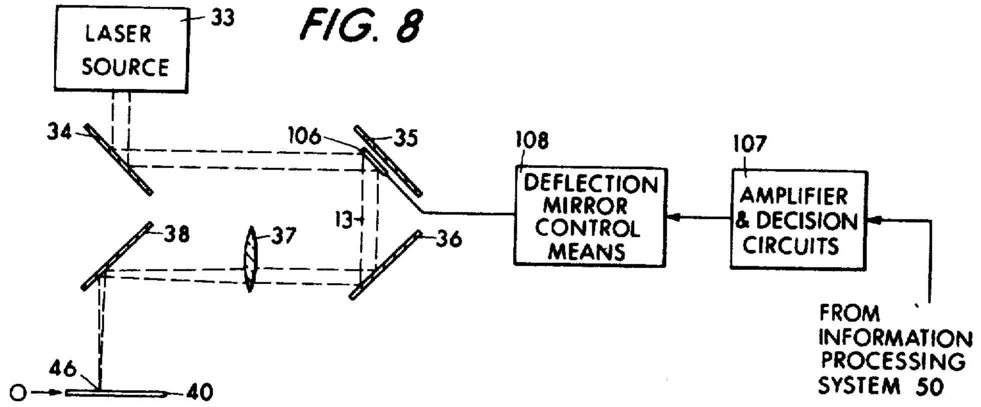
FIG. 8 depicts a deflection system representing an alternative embodiment of the system described with reference to FIG. 2C.

Although a prism means is shown in FIG. 1 for deflecting beam portion 13 of the beam split off from source 33 to provide the apparent source of variable reference beam 45, other alternative means, such as the movable deflection mirror system shown in FIG. 8 may also be used. In that figure a small movable deflection mirror 106 is positioned in front of fixed deflection mirror 35 substantially at the center thereof. Movable mirror 106 deflects beam portion 13 toward deflection mirror 36 as shown. The angular position of deflection mirror 106 then determines the direction of such beam portion and, consequently, determines the position of point 46 at the object plane O. Appropriate amplifier and decision circuits 107 and deflection mirror control means 108, as shown in more detail in FIG. 9, may be utilized to control the position of deflection mirror 106.

Figure 9:
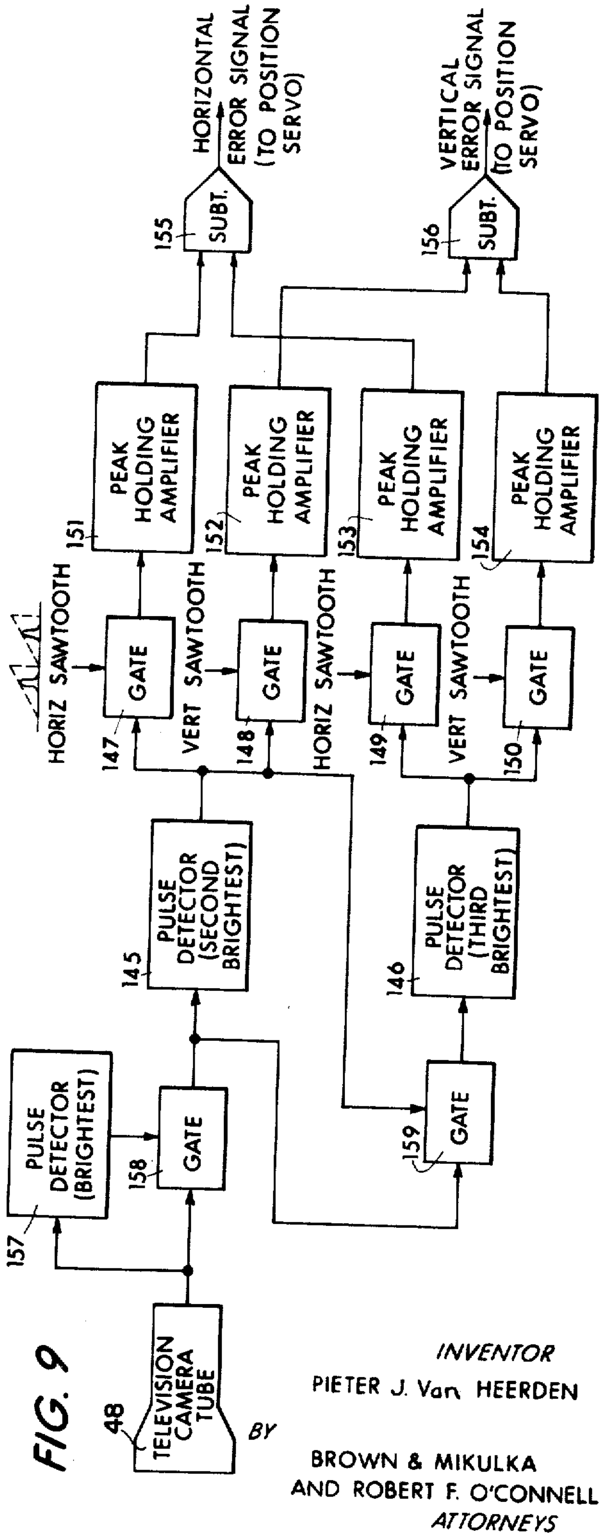
FIG. 9 depicts a block diagram representing a particular embodiment of a portion of the system shown in FIG. 8.

As shown in FIG. 9, the video output signal from television camera tube 48 is fed directly to a first pulse detector circuit 157, which detects the brightest image produced at image plane I, and through a first gate 158 to a second pulse detector circuit 145 which detects the second brightest image at image plane I. Such video output signal is also fed through first gate 158 and through a second gate 159 to a third pulse detector circuit which detects the third brightest image at image plane I. The purpose of gates 158 and 159 is similar to that discussed with reference to gate 139 in FIG. 7 and assures that pulse detectors 145 and 146 detect only those images for which they are set. The images detected by detectors 145 and 146 represent the real and ghost images of variable reference beam 45. The operation of such pulse detectors supplies a pair of trigger pulse output signals, each of which is in turn fed to a pair of gates, the signal from pulse detector 145 being fed to gates 147 and 148 and the signal from pulse detector 146 being fed to gates 149 and 150. Horizontal sawtooth and vertical sawtooth signals are also supplied to gates 147, 148, 149 and 150 in a manner similar to the operation described with reference to FIG. 6, the outputs of such gates being fed to peak holding amplifiers 151, 152, 153 and 154, as shown. The horizontal output signals from peak holding amplifiers 151 and 153 are fed to a subtractor circuit 155 and the vertical output signals from peaking holding amplifiers 152 and 154 are fed to subtractor 156. The output error signals from such subtractor circuits provide horizontal and vertical control signals to suitable amplifier and servo motor means to drive the deflection mirror 106 to the desired position to bring such real and ghost images of variable reference beam 45 into coincidence.

Figure 10:
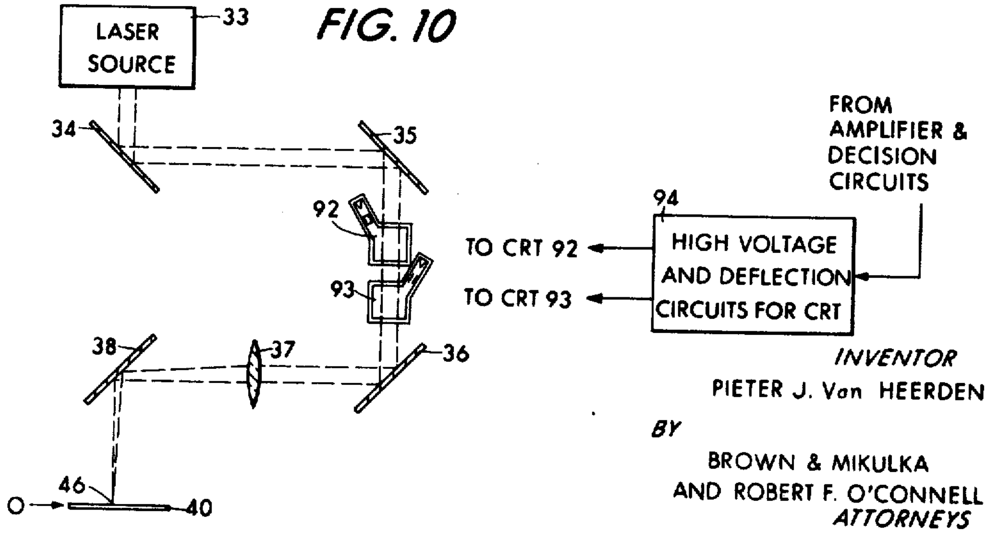
FIG. 10 depicts a deflection system representing another alternative embodiment of the systems described with reference to FIG. 2C.

Another alternative method for deflecting such beam to provide an apparent source of variable reference beam 45 may be in the form of a substantially electronic construction as shown and discussed with reference to FIG. 10. The operation of such deflection means is based on the principle of deflecting a light beam with an optical grating in a manner similar to that described with reference to my previously filed application. In FIG. 10 two gratings are utilized in series and are designed to deflect the beam in mutually perpendicular planes, the direction and extent of the deflection of the beam being controlled by varying the periods of the gratings elcetronically. The variable periodicity gratings comprise the screens of a pair of cathode ray tubes 92 and 93 located in the path of portion 13 of the beam which has been split off from the beam generated by laser source 33. Thus, the configuration of FIG. 10 may be substituted for the configurations shown previously in FIG. 2C and FIG. 5. Beam portion 13 which is deflected from deflection mirror 35 is caused to pass through the two screens of such tubes toward deflection mirror 36. Well-known high voltage and deflection circuits 94 provide signals for controlling the cathode ray tubes so as to cause each of the electron beams to write a grating having a period such that the beam portion 13 deflected from mirror 35 will be deflected as desired to bring it into focus at point 46 at object plane O as shown.

In the particular embodiment shown in FIG. 10, the cathode ray tube may utilize the eidophor principle discussed above with reference to cathode ray tube 21 in FIG. 1 wherein a thin oil layer at the screen thereof has its thickness modulated by the scanning electron beam which deposits charge thereon so as to cause the light beam illuminating such oil layer to undergo a periodic phase shift. It is possible to control the electron beam so that it writes a phase shift grating of the required period. Other means, such as a tube which utilizes the "scotophor" principle may be used to provide such a phase shift grating as discussed in my previously described patent application. In addition, a polymer in a thermal plastic condition may be used at the screen of a cathode ray tube upon which a phase shift grating can be written by an electron beam.

Although the preferred embodiment of FIG. 1 shows the use of a planar storage element in combination with a three-dimensional element, it should be possible to utilize a planar element alone if a more elaborate source for producing a variable reference beam is utilized in order to avoid the generation of multiple, superimposed information-containing images at image plane I during retrieval. For example, a plurality of variable reference beams may be used to identify each image which is being stored, such beams being derived from a plurality of apparent sources rather than the single variable reference beam derived from a single apparent source as in FIG. 1. The geometric configuration, or pattern, at object plane O of such plurality of apparent sources is arranged so as to be different for each of the information-containing images which are stored. For example, if three apparent sources are focused at the object plane O in the form of a triangle, such triangle may be rotated through a preselected angle each time a different image is stored. Alternatively, four apparent sources in the form of a square or rectangle may be utilized and such configuration similarly rotated through a preselected angle each time a different image is stored. Other geometric configurations and variations thereof will occur to those in the art to provide different apparent source patterns for each image which is being stored. In this manner the unique information concerning each of the stored images can be retrieved from a planar storage element alone and suitably recognized at image plane I. So long as each pattern of the plurality of apparent source is sufficiently different from each other pattern, undesirable information-containing images not associated with the particular pattern under consideration either will not appear at the image plane at all or else will appear so faintly that they will not impair the ability of the system to recognize the desired information-containing image which has been generated. Suitable methods for generating varying patterns of such plurality of apparent sources will occur to those skilled in the art for this purpose.

Such methods for generating varying patterns of multiple apparent sources as discussed above may also be used in the system shown in FIG. 1 and may be helpful in any situation where undesirable images, which may be superimposed on the desired image, prove troublesome.

The system of FIG. 1 shows an optical associative memory system which includes still another improvement to that originally depicted in my above-referenced copending patent application. In the system as originally shown in such application, an information-containing image, such as presented on a photographic silver transparency, is placed in the path of a first beam derived from a laser source which beam is modulated thereby and directed toward a storage element so that such information can be stored therein. In my previous system, in order to store a subsequent piece of information, a new transparency containing such new information-containing image must be substituted for the previous trasparency and placed at the same position. In order to store a plurality of such information-containing images in sequence, appropriate mechanical or manual means must be used to substitute successively the necessary transparencies containing each of the information-containing images involved.

In the improved invention embodiment shown in FIG. 1 a system is provided for storing successive information-containing images rapidly without the necessity for such relatively slow-acting mechanical or manual substitution means. In the particular embodiment of such a system shown in FIG. 1, television camera tube 51 is used together with receiver cathode ray tube 21 using the eidophor principle to provide at an object plane O on the screen 22 of tube 21 a display of a succession of images to be stored, for example, from a plurality of scenes such as indicated by object 52 which are being viewed by camera tube 51 during storage.

Storage can be achieved of scenes which may be varying relatively rapidly since, in the particular embodiment shown, the image at screen 22 changes rapidly in accordance with changes in scene 52. If, for example, a plurality of objects are scanned discretely and successively by television camera tube 51, images of such objects may be rapidly and discretely formed at screen 22 and the information contained therein can, therefore, be rapidly stored discretely and successively within the storage element without the necessity of mechanically or manually changing the image transparency at object plane O as required in my previous system.

Although the system shown in FIG. 1 utilizes a cathode ray tube having an eidophor screen, many other substitute embodiments may occur to those skilled in the art to produce rapidly a plurality of discrete information-containing images. Any medium, the characteristics of which can be suitably changed to form a rapidly changing image, can be used at object plane O so long as such image appropriately modulates beam 29 by diffraction, absorption or other suitable operational phenomena. For example, a phototropic, or photochromic material, which changes its properties under the stimulus of light and which rapidly reverts to its original properties when such stimulus is removed may be used to form a plurality of successive images at object plane O. Other alternatives utilizing materials capable of modulating a light beam passing there through and whose modulating properties can be changed rapidly in accordance with changes occuring in a changing scene being viewed for storage will occur to those in the art for accomplishing this purpose.

Further variations and modifications in the embodiments shown and discussed above will occur to those skilled in the art within the scope of the invention. Hence, the invention is not to be construed as limited to the particular embodiments disclosed except as defined by the appended claims.

What is claimed is:

1. An optical information storage and retrieval system comprising in combination:
- a storage member,
- means for directing a first beam of light towards said storage member,
- an information-containing image disposed at an object plane in the path of said first beam for modulating said first beam,
- means for directing a second beam of light coherent with said first beam toward a reference plane and for focusing said second beam at a first fixed point at said reference plane, said point representing the location of an apparent fixed reference light source;
- means for directing a fixed reference beam from said apparent fixed reference light source at said reference plane toward said storage member;
- means for directing at least a third beam of light coherent with said first and second beams toward said reference plane and for focusing said third beam at a second point at said reference plane, said point representing the location of an apparent variable reference light source;
- means for varying the position of said second point at said reference plane;
- means for directing a variable reference beam from said apparent variable reference light source at said reference plane toward said storage member;
- said modulated beam, said fixed reference beam and said variable reference beam thereby intersecting at said storage member thereby the information contained on said information-containing image is stored in said storage member;
- means for generating during retrieval a pattern of light at an image plane, said pattern representing information stored in said storage member; and
- means for sensing said pattern of light.

2. An optical information storage and retrieval system in accordance with claim 1 wherein said reference plane and said object plane coincide.

3. An optical information storage and retrieval system in accordance with claim 2 where in said means for generating said pattern of light includes:
- means for illuminating said storage medium with light from said first beam for producing at said image plane a first ghost image of the apparent source of said fixed reference beam and a second ghost image of an apparent source of said variable reference beam.
- means for sensing the positions of said ghost images and for controllably moving said ghost images to specified positions at said image plane;

means for illuminating said storage medium with light from said third beam for producing a real image of an apparent source of said variable reference beam at a position at said image plane which coincides with the position of said second ghost image at said image plane, whereby said pattern of light is generated at said image plane.

4. An optical information storage and retrieval system in accordance with claim 2 wherein said storage member includes at least a storage element having a substantially planar configuration.

5. An optical information storage and retrieval system in accordance with claim 4 and further including:

a first lens disposed between said object plane and said planar storage element; and a second lens disposed between said planar storage element and said image plane;

said storage element being positioned between said first and second lenses at the focal planes thereof.

6. An optical information storage and retrieval system in accordance with claim 2 wherein said storage member comprises:

a first substantially planar storage element; and a second three-dimensional storage element positioned adjacent said planar storage element and disposed at the side of said planar storage element opposite to that from which said modulating beam, said fixed reference beam and said variable reference beam are directed.

7. An optical information storage and retrieval system in accordance with claim 2 wherein said means for varying the position of said second point at said reference plane includes:

a prism system comprising a plurality of prisms; and means for selecting a combination of one or more of said prisms and positioning said selected combination in the path of said third beam to deflect said beam whereby the position of said second point at said reference plane is controllably varied.

8. An optical information storage and retrieval system in accordance with claim 2 wherein said means for varying the position of said second point at said reference plane comprises:

a movable deflection mirror; and means for controllably moving said movable deflection mirror to deflect said third beam whereby the position of said second point at said reference plane is controllably varied.

9. An optical information storage and retrieval system in accordance with claim 2 wherein said means for varying the position of said second point at said reference plane includes:

deflection means comprising a variable periodicity optical grating disposed in the path of said third beam; and means for controlling the period of said optical grating whereby the position of said second point at said reference plane is controllably varied.

10. An optical information storage and retrieval system in accordance with claim 9 wherein said deflection means comprises:

at least a cathode ray tube having a target screen positioned in the path of said third beam, said target screen comprising a material having light transmission properties variable in accordance with an electron beam, and means for scanning said electron beam to form an optical grating at said target screen having a period determined to produce a deflection of said third beam.

11. An optical information storage and retrieval system in accordance with claim 10 wherein said deflection means includes:

a pair of cathode ray tubes, each having a target screen positioned in the path of said third beam and comprising a material having light transmission properties variable by an electron beam; and means for scanning each of said electron beams to form an optical grating of each of said target screens having a period determined to produce the deflection of said third beam in orthogonal directions.

12. An optical information storage and retrieval system in accordance with claim 3 wherein said means for controllably moving said ghost images includes means for causing said first ghost image of the apparent source of said fixed reference beam to be moved to a preselected position at said image plane.

13. An optical information storage and retrieval system in accordance with claim 12 wherein:

said first fixed point at said reference plane is at the the center of said reference plane; and said preselected position of said first ghost image at said image plane is at the center of said image plane.

14. An optical information storage and retrieval system in accordance with claim 3 which further includes:

means for viewing an object; and means for generating an image of said object at said object plane.

15. An optical information storage and retrieval system in accordance with claim 14 which further includes:

means for moving said viewing means whereby said first ghost iamge is caused to be moved to a preselected position at said image plane.

16. An optical information storage and retrieval system in accordance with claim 15 wherein said means for moving said viewing means includes:

means for rotating said viewing means about a pair of orthogonal axes whereby said viewing means is directed at said object at a viewing angle such that said first ghost image is caused to move to a preselected position at the center of said image plane.

17. An optical information storage and retrieval system in accordance with claim 14 wherein said viewing means includes:

means for continuously varying the size of the image generated at said object plane.

18. An optical information storage and retrieval system in accordance with claim 17 wherein said size varying means includes:

a zoom-type lens mounted on said viewing means;

means for moving said zoom-type lens over a continuous range during retrieval for changing the size of said image of said object at said object plane; and means for maintaining said zoom-type lens at a position wherein the size of said image of said object at said object plane during retrieval is substantially the same as the size of said information-containing image at said object plane during storage.

19. An optical information storage and retrieval system in accordance with claim 14 wherein said viewing means includes:

means for distorting said image of said object generated at said object plane.

20. An optical information storage and retrieval system in accordance with claim 19 wherein said distorting means includes means for rotating said image of said object generated at said object plane.

21. An optical information storage and retrieval system in accordance with claim 20 wherein said rotating means comprises means for rotating said viewing means about its longitudinal axis.

22. An optical information storage and retrieval system in accordance with claim 19 wherein said distorting means includes means for creating a barrel-type or a pin-cushion type of distortion of said image of said object generated at said object plane.

23. An optical information storage and retrieval system in accordance with claim 19 wherein said distorting means includes means for providing a rhomboid-type of distortion of said image of said object generated at said object plane.

24. An optical information storage and retrieval system in accordance with claim 19 wherein said distortion means includes means for elongating the image of said object generated at said object plane in at least one orthogonal direction.

25. An optical information storage and retrieval system in accordance with claim 24 wherein:

said viewing means comprises a television camera tube; and said elongating means includes means for changing the scanning characteristics of said camera tube whereby the image of said object generated at said object plane is elongated in at least one of said orthogonal directions.

26. An optical information storage and retrieval system in accordance with claim 1 wherein:

said means for directing at least a third beam comprises means for directing a plurality of other beams of light coherent with said first and second beams toward said reference plane and for focusing said other beams at a plurality of specified points at said reference plane, said points representing the locations of a plurality of apparent variable reference light sources;

said varying means comprises means for varying the positions of said specified points at said reference plane; and said directing means comprises means for directing a plurality of variable reference beams from said plurality of apparent variable reference light sources at said reference plane toward said storage member, said modulated beam, said fixed reference beam and said plurality of variable reference beams thereby intersecting at said storage member whereby the information contained on said information-containing image is stored in said storage member.

27. An optical information storage and retrieval system in accordance with claim 26 wherein said reference plane and said object plane coincide.

28. An optical information storage and retrieval system in accordance with claim 27 wherein said means for generating said pattern of light includes:

means for illuminating said storage medium with light from said first beam for producing at an image plane a first ghost image of the apparent source of said fixed reference beam and plurality of other ghost images of the apparent sources of said variable reference beams;

means for sensing the positions of said first ghost image and said plurality of other ghost images and for controllably moving said ghost images to specified positions at said image plane;

means for illuminating said storage medium with light from said plurality of other beams for producing a plurality of real images of said plurality of apparent variable reference light sources at positions at said image plane which coincide with the positions of said plurality of other ghost images at said image plane, whereby said pattern of light is generated at said information image plane.

29. An optical information storage and retrieval system in accordance with claim 26 wherein said storage medium comprises a storage element having a substantially planar configuration.

30. An optical information storage and retrieval system in accordance with claim 29 and further including:

a first lens disposed between said object plane and said planar storage element;

a second lens disposed between said planar storage element and said image plane; and said storage element being positioned between said first and second lenses at the focal planes thereof.

31. An optical information storage and retrieval system comprising in combination:

a storage member, means for directing at least two coherent light beams toward said storage member, means for sequentially generating a plurality of information-containing images for disposition at an object plane in the path of at least one of said plurality of light beams for modulating said one beam, means for directing the other of said light beams toward said storage member for intersecting with light from said modulated beam at said storage member;

said generating means comprising means for producing an energizing signal which is rapidly and sequentially changing and a photochromic material capable of rapidly and sequentially forming a plurality of separate information-containing images in response to stimulation by said energizing signal.

32. An optical information storage and retrieval system in accordance with claim 31 wherein said generating means comprises:

a cathode ray tube including a target screen positioned in the path of said one of said plurality of said light beams and comprising a material having light transmission properties variable by an electron beam; and means for providing an electron beam scanning signal for rapidly and sequentially scanning said target screen to form a plurality information-containing images at said target screen.

33. An optical information storage and retrieval system in accordance with claim 32 wherein cathode ray tube is of the eidophor type.

References Cited

UNITED STATES PATENTS

| | | | |
|---|---|---|---|
| 3,296,594 | 1/1967 | Van Heerden | 340—172.5 |
| 3,308,444 | 3/1967 | Ting | 340—173 |
| 3,328,777 | 6/1967 | Hart | 340—173 |
| 3,341,826 | 9/1967 | Lee | 340—173 |
| 3,218,390 | 11/1965 | Bramley | 178—7.85 |
| 3,408,656 | 10/1968 | Lamberts | 340—173 |

PAUL J. HENON, Primary Examiner

H. E. SPRINGBORN, Assistant Examiner

U.S. Cl. X.R.

178—7.85; 340—173